Jan. 18, 1966  L. T. SKEGGS  3,230,048
CHROMATOGRAPHY ANALYSIS APPARATUS
Filed Aug. 17, 1962  3 Sheets-Sheet 1

INVENTOR.
LEONARD T. SKEGGS
BY Harry Cole
ATTORNEY

Jan. 18, 1966  L. T. SKEGGS  3,230,048
CHROMATOGRAPHY ANALYSIS APPARATUS
Filed Aug. 17, 1962  3 Sheets-Sheet 2

INVENTOR.
LEONARD T. SKEGGS
BY Harry Cole
ATTORNEY

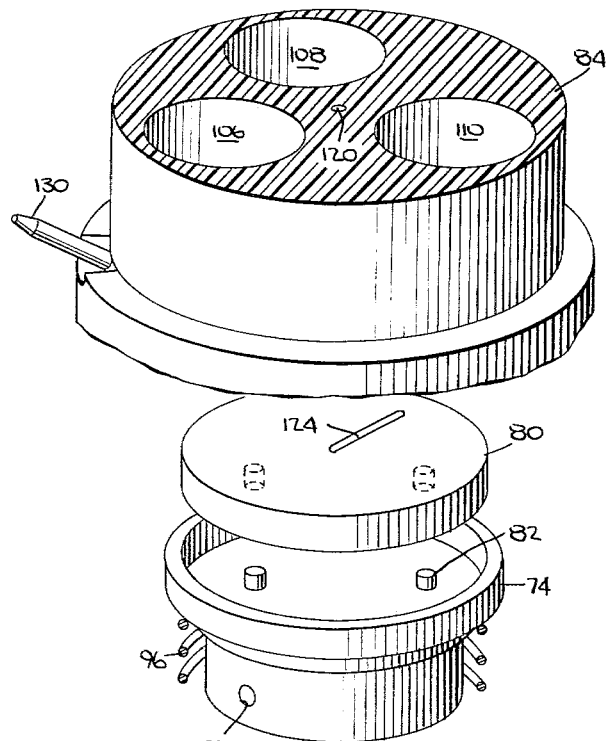
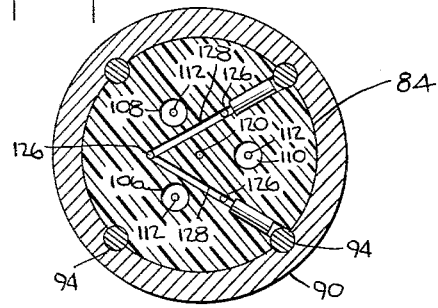
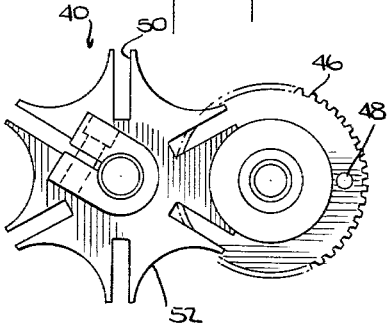
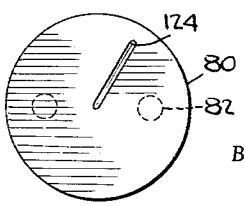

United States Patent Office 3,230,048
Patented Jan. 18, 1966

3,230,048
CHROMATOGRAPHY ANALYSIS APPARATUS
Leonard T. Skeggs, Cleveland, Ohio, assignor to Technicon Chromatography Corporation, Chauncey, N.Y., a corporation of New York
Filed Aug. 17, 1962, Ser. No. 217,569
12 Claims. (Cl. 23—253)

This invention relates to chromatography analysis.

One object of the present invention is the provision of a chromatography analysis apparatus with a continuously operable analyzer for examining the eluate from a plurality of columns in a manner which eliminates the time heretofore lost due to the use of an analyzer for each chromatography column.

Another object is the provision of a continuous chromatography analysis apparatus having an analyzer for analyzing the eluate from a plurality of chromatography columns in a manner whereby the record of the analysis represents the concentration of a substance in the eluate thereby obviating the necessity of integrating the areas under the curves of the record.

Another object is to provide chromatography analysis apparatus which automatically and continuously examines the eluate from a series of columns in a manner such that the distinctiveness of the different eluates from the columns is maintained throughout the analysis without contamination or interference of one eluate by another.

Another object is the provision of chromatography analysis apparatus having one or more chromatography columns with means for transmitting the eluting liquid at a constant flow rate through the column for the stripping operation and with means to transmit the whole or only part of the eluate, as desired, per unit of time from the column to the automatic analysis apparatus.

A further object is generally to improve the methods of chromatography analysis and to provide improved chromatography analysis apparatus.

The above and other objects, features and advantages of the invention will be more fully understood from the following description of the presently preferred embodiment of the invention considered in connection with the accompanying illustrative drawings.

In the drawings:

FIG. 4 is a perspective view of parts of the apparatus shown in FIGS. 2 and 3, in a disassembled condition, illustrating the relationships of said parts;

FIG. 5 is a cross section taken on line 5—5 of FIG. 2;

FIG. 6 is a top plan view taken on line 6—6 of FIG. 2; and

FIG. 7 is a bottom plan view taken in the direction of line 7—7 of FIG. 2.

Figure 1:
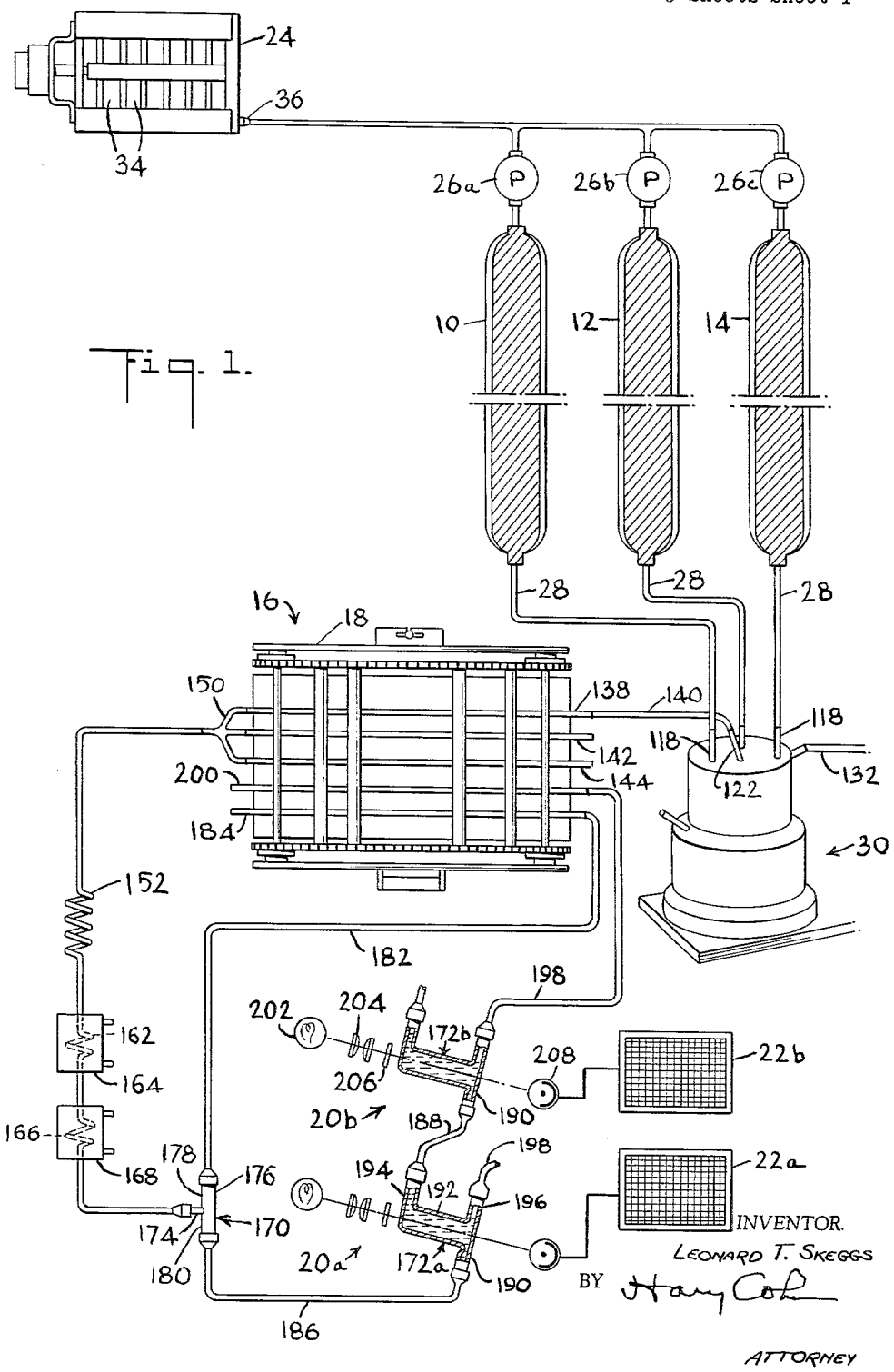
FIG. 1 is a more or less diagrammatic illustration of the apparatus according to the present invention.
Figure 2:
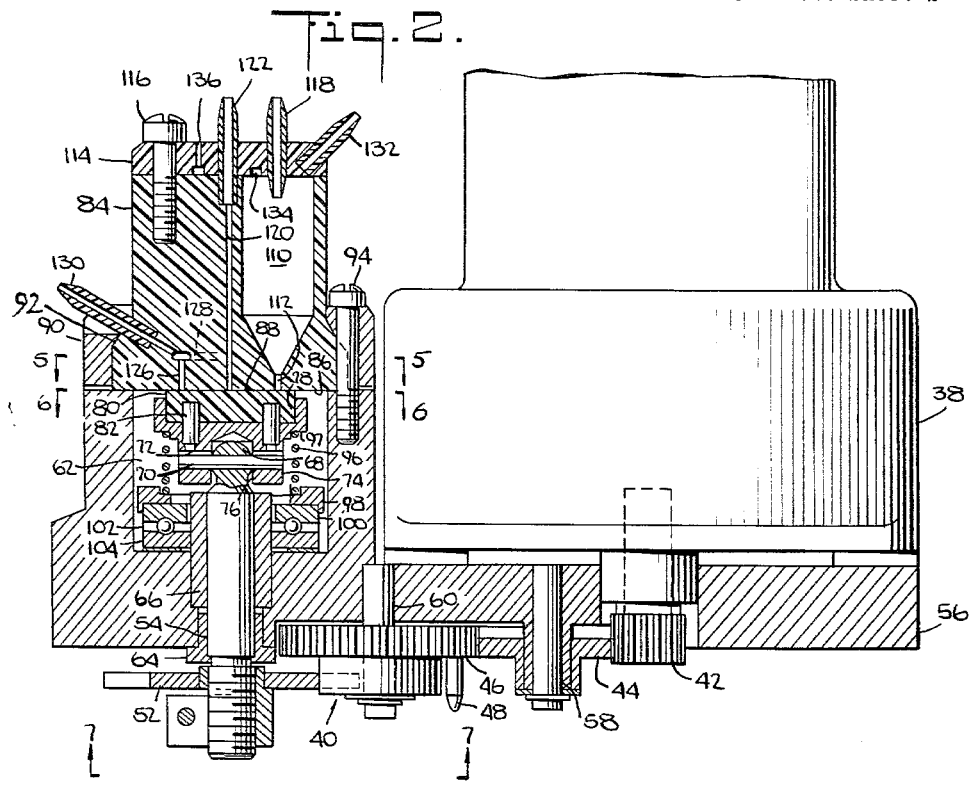
FIG. 2 is a vertical sectional view of part of the apparatus of FIG. 1.
Figure 3:
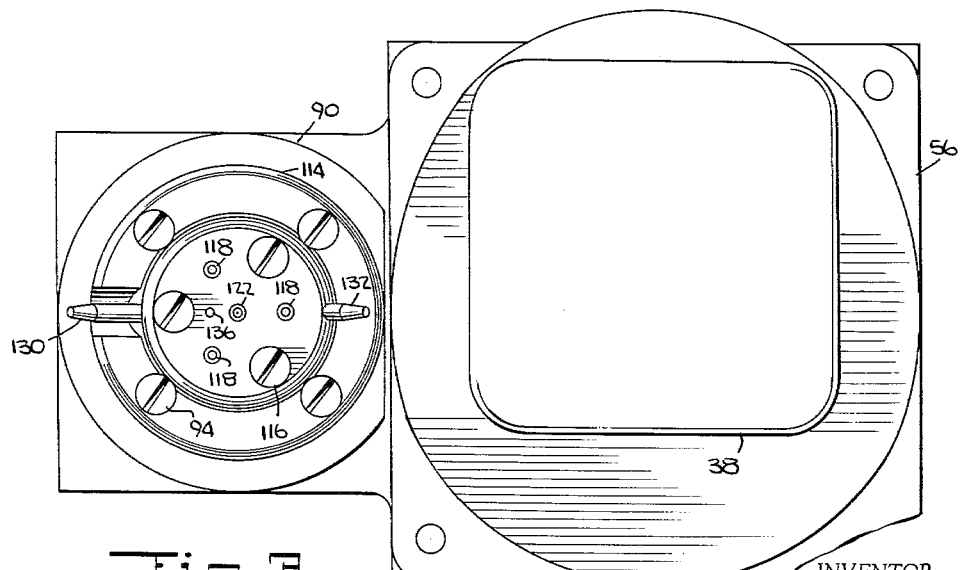
FIG. 3 is a top plan view of the apparatus shown in FIG. 2.

Referring now to the drawings in detail and particularly to FIG. 1, as illustrated therein, the chromatography analysis apparatus is arranged for amino acids determinations and comprises a series of chromatography columns, herein shown as three columns 10, 12 and 14, but it will be understood that any number of columns can be provided. The eluate from each of the columns is treated and analyzed by a continuous automatic analyzer 16 of the type shown in my U.S. Patent No. 2,797,149 issued June 25, 1957. The analyzer includes a proportioning pump 18, preferably of the type shown in U.S. Patent No. 2,935,028 issued May 3, 1960, which pumps the eluate, in the form of a stream, together with processing liquids and reagents, for treating the eluate for colorimetric examination. The treated eluate is colorimetrically examined by a pair of colorimeters 20a and 20b, of the flow cell type, which operate companion recorders 22a and 22b.

A variable gradient device 24 is provided for supplying eluent and pumps 26a, 26b and 26c pump the eluent through the inlet openings at the tops of each of the columns. Said pumps are of the positive displacement or piston type pumps for providing a constant flow rate of the buffer liquid or eluent from the variable gradient device through the companion columns, respectively, for the stripping operation. The eluent flows downwardly through the columns and separates the various zones of the chromatogram, and the resulting eluate is transmitted from the outlets at the bottoms of the columns, through suitable tubing 28, to an eluate collecting and flow control device 30 which controls the flow of eluate from the columns to analyzer 16, as will be explained more in detail hereinafter.

The variable gradient device 24 is preferably of the type shown and described in the U.S. patent application of Jack Isreeli, Serial No. 190,357, filed April 26, 1962, assigned to the assignee of the present application. Briefly described, the device comprises a series of chambers 34 which are in fluid flow communication with each other at their respective bottoms and which contain eluent of different concentrations. The eluent flows from one chamber to the succeeding chamber and from the device through outlet 36, so that the eluent which is supplied to the columns has a concentration which varies in a continuous manner. This improves the resolution of the various zones of the chromatogram.

In accordance with the invention, valve device 30 is operable to predetermine the exact quantity of the eluate from each of the columns which is transmitted during each operative cycle of the valve to the analyzer 16 for treatment and colorimetric analysis to determine the concentration of a constituent of the eluate. In this manner, the analyzer is continuously utilized and operates continuously during the collection of eluate, whereby the relatively slow flow of eluate from the column does not interfere or delay the relatively rapid treatment and analysis procedure. The treatment and analysis occur with a predetermined exact quantity of the eluate, whereby the peaks of the curves which result from the analysis of the eluate, as provided by the recorders 22a and 22b, represent the concentration of the particular constituent therein and it is not necessary to integrate the areas under the curves.

Referring now to FIGS. 2 to 7, device 30 is operated by a motor 38 that operates a Geneva drive mechanism 40 through meshing gears 42, 44 and 46. The driver pin 48 of the Geneva drive extends from the side of gear 46 and is operable to engage the slots 50, in succession, of the driven member 52 which is connected to a rotary rod 54 for rotating the latter intermittently about its longitudinal axis. The motor 38 is supported on a support 56 and gears 44 and 46 are supported for rotation on stub shafts 58 and 60, respectively, which extend from the bottom of support 56.

Rod 54 extends through support 56 into a recess 62 provided in the support. The lower end of the rod is journaled in a bearing 64 and the upper portion of the rod extends through a sleeve-type bearing 66 which is fixed in the support 56 and extends into the recess 62. The upper end 68 of the rod is ball-shaped and carries a pin 70 which fits loosely in a transversely extending slot 72 provided in a cup-shaped member 74 which has a central recess 76 into which ball end 68 of the rod extends. It is to be observed that the ball and pin connection between rod 56 and member 74 permits universal adjusting movement of the latter with respect to the ball end of the rod.

The upper end of member 74 has a recess 78 which mounts a rotary disk 80 made of a suitable plastic material, for example a plastic material sold under the trademark "Kel-F." The disk is secured to member 74 by pins 82.

A block 84 of suitable plastic material, for example plastic material sold under the trademark "Kel-F," is mounted on support 56, covering recess 62, and the bottom surface 86 of the block is in surface-to-surface contact with the upper surface 88 of the rotary disk 80. The block is held in position on support 56 by a ring 90 which engages inclined peripheral shoulder 92 provided on the block, and the ring is secured to the support by screws 94.

Disk 80 is biased upwardly against the bottom of block 84 by a coil compression spring 96 so that a fluid tight seal is provided between the contacting surfaces 86 of the disk and 88 of the block. One end of the spring engages the peripheral shoulder 97 of member 74 and the opposite end of the spring engages a ring 98 which is supported on the rotary race 100 of a thrust bearing 102 which has its lower race 104 fixed to bearing 66.

From the foregoing it will be observed that operation of the Geneva gear drive results in the intermittent rotation of rod 54 which intermittently rotates the rotary disk 80 and spring 96, so that the spring does not provide any forces which restrain the rotation of the disk.

Block 86, as herein shown, has three vertical chambers or eluate receivers 106, 108 and 110 which are concentrically positioned symmetrically about the longitudinal axis of the block, and it will be observed that the number of receivers corresponds to the number of columns provided in the apparatus. The bottom of each receiver is tapered and connects to an outlet passage 112. The top of the block and the tops of the receivers are covered by a plate 114 of a suitable plastic material, for example a plastic material sold under the trademark "Kel-F," and the plate is secured in position by screws 116. The plate carries an inlet nipple 118 for each of the receivers and the nipples are connected to tubing 28 for the delivery of the eluate from the columns to their respective receivers. The block is provided with an axial passage 120 and an eluate outlet nipple 122 is in communication with the passage and extends through plate 114.

Surface 88 of disk 80 is provided with a groove 124 (FIGS. 4 and 6) which extends radially from the center of the disk a distance equal to the radial distance of outlet passages 112 from the axis of the block. A series of wash-liquid passages 126 (FIGS. 2 and 5) are provided in block 84 and the passages are arranged along the same circular row as outlet passages 112 of the eluate collecting receivers, with a passage 126 between adjacent passages 112. The wash-liquid passages 126 are in fluid flow communication with each other through connecting passages 128 and an inlet nipple 130 for a wash-liquid is in communication with passages 128 for transmitting wash-liquid to passages 126. Nipple 130 is connected, by suitable tubing, to a source of wash-liquid which may be delivered to the nipple by a pump, or by gravity, or by other suitable means.

Since the presence of ammonia in the atmosphere often has detrimental effects on the amino acid eluate, the tops of the chambers 106, 108 and 110 are preferably exposed to a source of an inert gas, for example nitrogen. This can be readily accomplished by providing a nipple 132 in plate 114 in communication with one of the receivers, for example receiver 110, and the tube can be connected to a suitable source of pressurized nitrogen. The bottom surface of plate 114 is provided with an annular groove 134 which confronts the tops of the receivers for distributing the nitrogen to each of the receivers, and an outlet passage 136 connects groove 134 with the atmosphere to permit the flow of the nitrogen into and out of the receivers.

In the operation of the control device 30, disk 80 is rotated intermittently and passage 124 is moved into registry with the outlet passages 112, in succession, of the eluate collecting receivers, and in registry with the intermediate wash-liquid passages 126, in succession, so that predetermined exact quantities of the eluate are collected in said receivers and the eluate is transmitted under the control of valve disk 80 from their respective receivers, in succession, through outlet passage 120 and outlet nipple 122, respectively, and pump tube 138 (FIG. 1) which is connected to the outlet nipple by tubing 140. The aspiration of all of the eluate from the receiving chamber is advantageous because this eliminates or reduces the likelihood of contamination and also because it results in increased sensitivity when the effluents from a plurality of columns are involved, but it is within the scope of the invention unless otherwise indicated to transmit to the analysis apparatus only a part of the eluate which flows out of the column per unit of time. This can be accomplished by omitting or reducing the size of the collection receptacles 106, 108 and 110 and by providing the valve device with an outlet to waste or separate collection of that part of the eluate which is not transmitted to the colorimeter of the analysis apparatus. It is also within the scope of the invention to omit the use of a wash liquid and in this connection it may be noted if desired, the tube 144 which supplies the reagent can be connected to the inlet end of tube 138 so that the reagent will flow through pump tube 138 during aspiration of the eluate and between the successive aspirations of the eluate into the analysis apparatus.

The Geneva drive mechanism 40 is arranged so that the dwell period between successive rotary indexing movements of disk 80 is sufficiently long so that the quantities of eluate withdrawn from the companion chambers are of a sufficient amount to provide peaks on the curves of the recording which represent the quantity of an ingredient in the corresponding eluate. Furthermore, it will be understood that the size of the eluate collecting receivers is sufficient to collect the eluate which is continuously transmitted from the companion chromatography column during the operation of device 30.

In the use of the apparatus, the quantity of eluate transmitted to the analyzer 16 during a dwell period of operation of device 30 and also the quantity of eluate collected from each of the columns during the same dwell period is a fraction of the total eluate of the chromatogram containing the particular constituent with respect to which the analysis is being made. Accordingly, to determine the total concentration of the particular constituent in the chromatogram, the peaks of the curves corresponding to each eluate fraction containing the particular constituent are added together.

While the invention has been described with respect to the transmission of a stream of longitudinally spaced eluate segments, separated from each other by an intervening wash liquid, it will be understood that it is within the scope of the invention to provide a standard liquid having a known quantity of a known constituent between successive segments of the eluate, and it is preferred that the standard liquid segments be separated from the adjacent eluate liquid segments by a wash-liquid. This can be readily accomplished by providing a passage in block 84 for the standard liquid between adjacent passages 112 for the eluate and by providing a passage for the wash-liquid between each eluate passage and standard liquid passage. The standard liquid can be supplied through an inlet nipple, similar to nipple 130, and the standard liquid passages can be arranged to communicate with each other by the use of passages similar to passages 128 for the wash-liquid. With such an arrangement, the stream which is transmitted to the analyzer 16 will comprise a series of longitudinally spaced segments of eluate, separated from each other by an intervening standard liquid segment which is separated from the adjacent eluate segment by a wash-liquid segment. Standard curves will be provided on the recording, positioned between curves which represent the quantity of a constituent in the eluate and the standard curves provide a check on the accuracy of the eluate analysis curves.

Referring now more specifically to the analyzer 16, in addition to pump tube 138 for the liquid stream from device 30, pump 18 is provided with a pump tube 142 which supplies ammonia-free segmentizing air or other inert gas, for example nitrogen, and with a pump tube 144 which supplies a ninhydrin reagent that reacts with the amino acid effluent to produce a color corresponding to the quantity of the amino acid in the effluent. During the operation of the pump, the different streams join each other at fitting 150 and the gas divides the joining liquids into a segmented stream consisting of a series of longitudinally spaced liquid segments separated from each other by intervening gas segments. The gas segments also help maintain the passages of the apparatus clean and prevent contamination of a liquid segment by a preceding liquid segment, as explained in my above mentioned U.S. Patent No. 2,797,149. The segmented stream is transmitted to a horizontal helical mixing coil 152 where the eluate and ninhydrin reagent of each liquid segment are mixed together. The resulting stream is transmitted through a coil 162 which is immersed in a heating bath 164 for developing the color and the resulting colored segmented stream is transmitted through another coil 166 immersed in a cooling bath 168, and therefrom to a gas separating device 170 which removes the gas segments from the segmented stream so that a consolidated liquid stream is transmitted to the flow cells 172a and 172b of the colorimeters 20a and 20b, respectively.

The gas separating device comprises a horizontal inlet tubular part 174 which is connected to a vertical tubular part 176 at a point intermediate the length thereof to form an upper arm 178 and a lower arm 180. The upper arm provides a tubular offtake into which the gas segments of the segmented stream rise and thereby are separated from the segmented stream. To aid in this separation, a suction tube 182, which is connected to an aspirating pump tube 184, is also connected to tubular offtake 178 so that the gas segments are aspirated from the segmented stream through said offtake with a minor portion of the colored liquid, and the major portion of the liquid flows downwardly into arm 180 in the form of a consolidated stream which is transmitted to flow cell 172a through tube 186 and from said flow cell through the other flow cell 172b, through the connecting tube 188.

Each of the flow cells is identical and, briefly described, is made of glass sold under the trademark "Pyrex" and comprises a downwardly extending tubular inlet part 190, a tubular liquid and light passage part 192, an upwardly extending tubular outlet part 194, and another tubular outlet part 196 which extends upwardly from part 192, at the inlet end of the cell, to permit any remaining gas in the incoming liquid to escape from the cell through said outlet part 196. A suction tube 198 is connected to outlet part 196 and to an asiprating pump 200 for aiding in the removal of any of the remaining gas and it will be understood, as illustrated with respect to flow cell 172b, that a suction tube 198 is provided for each flow cell for removing any gases that might still be present in the incoming streams, and each of the suction tubes is connected to an aspirating pump tube, such as tube 200. To aid in the escape of the gases, the flow cells can be titled in the manner shown in FIG. 1.

Tube 188 is connected to the outlet 194 of flow cell 172a and to the inlet 190 of flow cell 172b so that the liquid which is to be colorimetrically examined passes through both flow cells, in succession, for examination by light of two different wave lengths in accordance with known practice in connection with chromatographic analysis of amino acids. The outlet 194 of flow cell 172b can be connected to waste or to some other receptacle, as required or desired.

Each colorimeter 20a and 20b is provided with a source of light 202, focusing lenses 204, and one or more filters 206 to provide the necessary wave lengths, it being understood as indicated above, that the wave length of the examining light of colorimeter 20a is different from the wave length of the examining light of colorimeter 20b. A photoelectric device 208 receives the light after it passes through the liquid in the companion flow cell and operates the companion recorder. The photoelectric device is connected in a well known null-type current ratio circuit to operate the recorder in a well known manner.

Further description of the colorimeters and flow cells is not considered necessary but if further information is desired, recourse can be had to the U.S. patent application of Seymour Rosin and William J. Smythe, Serial No. 192,149, filed May 3, 1962, assigned to a related company of the present assignee.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

I claim:
1. Chromatography analysis apparatus, comprising:
 (a) a plurality of chromatography columns each having an outlet for the simultaneous flow of the separate volumes of eluate from each of the columns,
 (b) a plurality of separate eluate receivers, one for each of said plurality of columns, each in fluid-flow communication with the outlet of its respective column, for concurrently collecting the separate volumes of eluate,
 (c) each of said receivers having an outlet for the collected eluate,
 (d) intermittently operable valve means normally closing said outlets of said receivers to permit the collection of said separate eluate volumes,
 (e) said valve means including a valve body having a passage therein,
 (f) a valve member intermittently operable for placing said outlets of the receiver, in succession, in communication with said valve passage, and
 (g) means in communication with said valve passage for analyzing the eluate from said receivers.
2. Chromatography analysis apparatus, comprising:
 (a) a chromatography column having an outlet for the separate volumes of eluate from the column,
 (b) an eluate receiver having an inlet connected to said outlet of the column for collecting said separate volumes and having an outlet,
 (c) an intermittently operable valve normally closing said outlet of said receiver to permit the collection of said separate volumes of eluate therein,
 (d) said valve including a valve body having a passage therethrough,
 (e) a valve member intermittently operable independently of the quantity of eluate in said receiver for placing said outlet of the receiver in communication with said valve passage,
 (f) means in communication with said valve passage for analyzing the eluate from said receiver, and
 (g) pump means connected to said valve passage for pumping the collected separate volumes of eluate from said receiver to said analysis means.
3. Chromatography analysis apparatus, comprising:
 (a) a chromatography column having an outlet for the separate volumes of eluate from the column,
 (b) an eluate receiver having an inlet connected to said outlet of the column for collecting said separate volumes and having an outlet,

(c) an intermittently operable valve normally closing said outlet of said receiver to permit the collection of said separate volumes of eluate therein, (d) said valve including a valve body having a passage therethrough, (e) a valve member intermittently operable independently of the quantity of eluate in said receiver for placing said outlet of the receiver in communication with said valve passage, and (f) gear mechanism for intermittently operating said valve member for alternately placing said outlet of said receiver into and out of communication with said valve passage.

4. Chromatography analysis apparatus, comprising:

(a) a chromatography column having an upper inlet for flow into the column of the eluent for the stripping operation and a lower outlet for the flow of the eluate or effluent in said operation;

(b) pump means of he constant flow rate type for pumping the eluent into said inlet and through said column and for pumping the eluate through said outlet;

(c) means for treating the eluate for analysis and for analyzing the eluate;

(d) means including a flow passage for transmitting the eluate from said outlet to said treatment and analysis means, comprising;

(e) valve means in the path of flow of the eluate from said outlet operable at predetermined times to open and close said passage for predetermined times; and (f) mechanism operable intermittently at predetermined times to actuate said valve to open and close said valve means at said predetermined times.

5. Chromatographic apparatus, comprising: a plurality of chromatographic columns, each column having an outlet for the flow of an eluate therefrom, and having eluates flowing from each respective outlet simultaneously; analysis means; and means coupled to each of said outlets and to said utilization means, for receiving all of the eluates concurrently from said outlets and for transmitting one of the eluates to said utilization means concurrently with the flow of the eluates from said outlets.

6. Chromatographic apparatus, comprising: a plurality of chromatographic columns, each column having an outlet for the flow of an eluate therefrom, and having eluates flowing from each respective outlet simultaneously; analysis means; and means coupled to each of said outlets and to said utilization means, for receiving all of the eluates concurrently from said outlets, and for transmitting one of the eluates at any given time to said utilization means while concurrently storing the remainder of the eluates concurrently with the flow of the eluates from said outlets.

7. Chromatographic apparatus, comprising: a plurality of chromatographic columns, each column having an outlet for the flow of an eluate therefrom, and having eluates flowing from each respective outlet simultaneously; analysis means; and means coupled to each of said outlets and to said utilization means, for concurrently receiving and individually storing all of the eluates from said outlets, and cyclically, serially, and individually transmitting each of the stored eluates for an interval of time to said utilization means, concurrently with the flow of the eluates from said outlets.

8. Chromatographic apparatus, comprising: a plurality of chromatographic columnns, each column having an outlet for the flow of an eluate therefrom, and having eluates flowing from each respective outlet simultaneously; a source of wash liquid; analysis means; and means coupled to each of said outlets, said wash liquid source, and to said utilization means, for concurrently receiving and individually storing all of the eluates from said outlets, and for cyclically, serially, and individually transmitting each of the stored eluates and wash liquid for an interval of time to said utilization means, each transmission of a stored eluate being spaced from the succeeding transmission of the next stored eluate by a transmission of wash liquid, concurrently with the flow of the eluates from said outlets.

9. Chromatographic apparatus, comprising: a plurality of chromatographic columns, each column having an outlet for the flow of an eluate therefrom, and having eluates flowing from each respective outlet simultaneously; analysis means having an inlet; a plurality of receptacles, each having an inlet coupled to a respective column outlet and an outlet; a fluid conveying means having an outlet coupled to said utilization means inlet and an inlet; and selective coupling means coupled to all of said receptacle outlets and to said fluid conveying means inlet, for coupling one of said receptacle outlets to said fluid conveying means inlet while closing all of the other of said receptacle outlets, each of said receptacle outlets being so coupled for an interval of time in cyclic succession concurrently with the flow of the eluates from said column outlets.

10. Chromatographic apparatus, comprising: a plurality of chromatographic columns, each column having an outlet for the flow of an eluate therefrom, and having eluates flowing from each respective outlet simultaneously; a source of an additional liquid having an outlet; analysis means having an inlet; a plurality of receptacles, each having an inlet coupled to a respective column outlet and an outlet; a fluid conveying means having an outlet coupled to said utilization means inlet and an inlet; selective coupling means coupled to all of said receptacle outlets, to said additional liquid source outlet, and to said fluid conveying means inlet, for alternatively coupling one of said receptacle outlets to said fluid conveying means inlet while closing all of the other receptacle outlets and said additional liquid source outlet, and for coupling said additional liquid source outlet to said fluid conveying means inlet while closing all of said receptacle outlets, each of said receptacle outlets being so coupled in cyclic succession and said additional liquid source outlet being so coupled subsequent to each of said receptacle outlets, concurrently with the flow of the eluates from said column outlets.

11. Chromatographic apparatus, comprising: a plurality of chromatographic columns, each column having an outlet for the flow of an eluate therefrom, and having eluates flowing from each respective outlet simultaneously; a first source of a first additional liquid having an outlet; a second source of a second additional liquid having an outlet; analysis means having an inlet; a plurality of receptacles, each having an inlet coupled to a respective column outlet and an outlet; fluid conveying means having an outlet coupled to said utilization means inlet and an inlet; selective coupling means coupled to all of said receptacle outlets, to said first additional liquid source outlet, to said second additional liquid source outlet, and to said fluid conveying means inlet, for selectively coupling one of said receptacle outlets to said fluid conveying means inlet while closing all of the other receptacle outlets and said first and second source outlets, for coupling said first source outlet to said fluid conveying means inlet while closing all of said receptacle outlets and said second source outlet, and for coupling said second source outlets to said fluid conveying means inlet while closing all of said receptacle outlets and said first source outlet, each of said receptacle outlets being so coupled in a cyclic succession and said first source inlet initially and said second source inlet subsequently being so coupled subsequent to each of said receptacle outlets, concurrently with the flow of the eluates from said column outlets.

12. Chromatographic analysis apparatus, comprising: a plurality of chromatographic columns, each column having an outlet for the flow of an eluate therefrom, and having eluates flowing from each respective outlet simultaneously; a source of a wash liquid having an outlet; analysis means having an inlet; a plurality of receptacles, each having an inlet coupled to a respective column outlet and an outlet; a fluid conveying means having an outlet coupled to said analysis means inlet and an inlet; selective coupling means coupled to all of said receptacle outlets, to said wash fluid source outlet, and to said fluid conveying means inlet, for alternatively coupling one of said receptacle outlets to said fluid conveying means inlet while closing all of the other receptacle outlets and said wash liquid source outlet, and for coupling said wash liquid source outlet to said fluid conveying means inlet while closing all of said rceeptacle outlets, each of said receptacle outlets being so coupled in cyclic succession and said wash liquid source outlet being so coupled subsequent to each of said receptacle outlets, concurrently with the flow of the eluates from said column outlets.

References Cited by the Examiner

UNITED STATES PATENTS

| | | | |
|---|---|---|---|
| 2,493,382 | 1/1950 | Bell | 141—131 X |
| 2,604,249 | 7/1952 | Gorham | 141—130 |
| 2,797,149 | 6/1957 | Skeggs | 23—230 |
| 2,935,028 | 5/1960 | Ferrari et al. | 103—149 |
| 2,935,908 | 5/1960 | Phillips | 23—253 X |
| 3,010,798 | 11/1961 | Whitehead et al. | 23—253 X |
| 3,047,367 | 7/1962 | Kessler | 23—253 X |
| 3,116,118 | 12/1963 | Whitehead et al. | 23—253 |

MORRIS O. WOLK, *Primary Examiner.*